No. 898,406. PATENTED SEPT. 8, 1908.
D. C. GRISWOLD.
STEP BEARING DEVICE.
APPLICATION FILED NOV. 23, 1907.
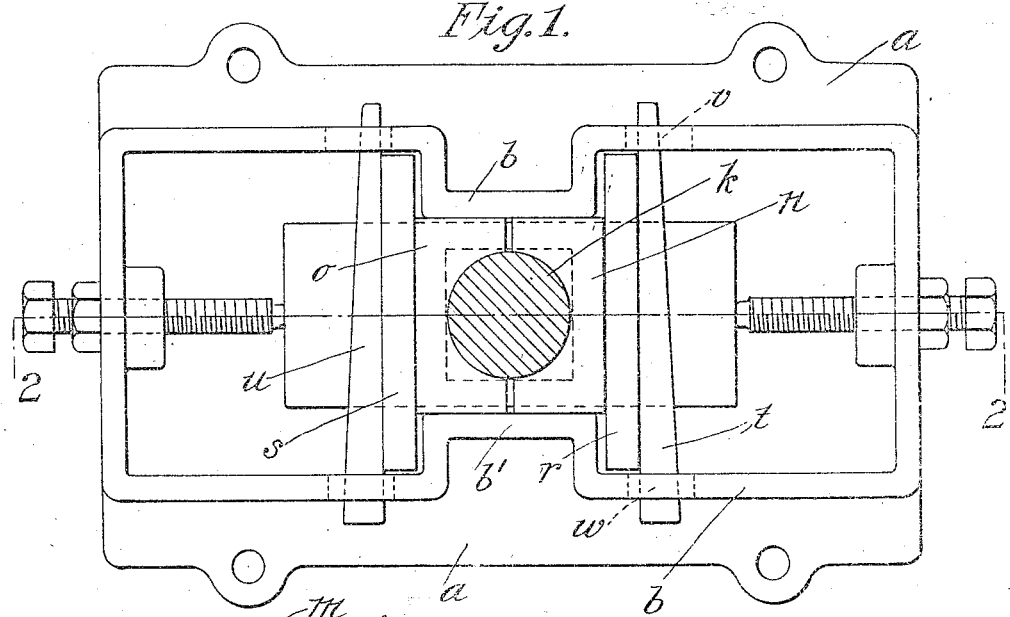
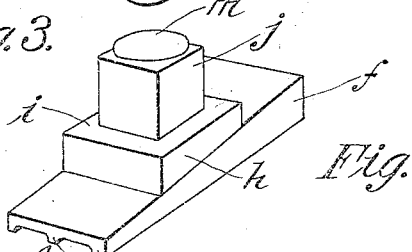
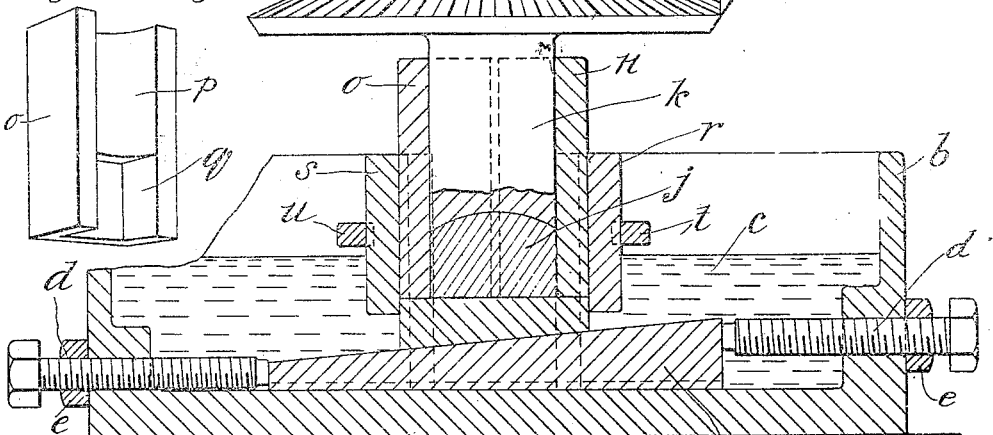
Witnesses
H. L. Sprague
H. W. Bown
Inventor,
David C. Griswold
by Chapin &c
Attorneys

UNITED STATES PATENT OFFICE.

DAVID C. GRISWOLD, OF NORTH WILBRAHAM, MASSACHUSETTS, ASSIGNOR OF ONE-HALF TO WILLIAM H. JOY, OF NORTH WILBRAHAM, MASSACHUSETTS.

STEP-BEARING DEVICE.

No. 898,408.  Specification of Letters Patent.  Patented Sept. 8, 1908.

Application filed November 23, 1907. Serial No. 403,495.

*To all whom it may concern:*

Be it known that I, DAVID C. GRISWOLD, a citizen of the United States of America, residing at North Wilbraham, in the county of Hampden and State of Massachusetts, have invented new and useful Improvements in Step-Bearing Devices, of which the following is a specification.

This invention relates to improvements in step bearings and means for adjusting the same, also in means for keeping the bearings thoroughly lubricated at all times.

The object of the invention is to provide a device or mechanism that will readily permit a vertical shaft (on the upper end of which is located a beveled gear) to be readily raised and lowered in order that the gears may properly mesh with each other at all times.

A further object of the invention is to provide a device that will readily permit the vertical bearing boxes to be readily removed or adjusted without dismantling any part of the machine to which the improvement is applied.

Further objects of the nature and construction of the invention will be set forth in detail in the specification and clearly pointed out in the claims.

In the drawings forming part of this application,—Figure 1 is a plan view of my invention showing the vertical shaft in section and clearly indicating the manner and means for adjusting the bearing boxes. Fig. 2 is a partial vertical longitudinal sectional view on line 2—2, Fig. 1. Fig. 3 is a detail perspective view of the adjusting wedges and the bearing block or step-piece located thereon. Fig. 4 is a detail perspective view of one of the bearing boxes, clearly showing the cutout or rectangular portion for receiving the step-bearing piece.

Referring to the drawings in detail, *a* designates the base portion of my improvement and *b* the vertical side walls of my device which constitute a receptacle for holding a suitable liquid lubricant, as indicated at *c*. The opposite ends of the side walls are provided with adjusting screws *d* and lock-nuts *e*. These screws are threaded into the walls *b* and engage the opposite ends of the wedge element *f* which is provided on its bottom surface with parallel ribs *g* for allowing the oil to freely circulate from one end of the casing to the other. Located on the wedge *f* is a block *h* also wedge-shaped in form the inclination being such that its upper surface *i* will be horizontal when in place.

*j* designates the step or bearing piece, rectangular in form, for receiving the lower end of the vertical shaft *k*. The upper surface of this bearing piece may be either curved, as shown at *m* or perfectly flat.

In order to properly maintain the shaft *k* in vertical alinement, the bearing boxes *n* and *o* are provided,—a detail view of one being shown in Fig. 4,—the curved surfaces *p* of which receive the curved surface of the shaft *k*. The bottom portion of these bearing boxes is cut out so as to form a rectangular opening *q* which, in the bottom portion of each bearing box receives the rectangular step bearing element *j*, as clearly shown in the assembled view in Fig. 2.

Vertically arranged plates *r* and *s* are placed against the outer surface of the bearing boxes *n* and *o* and are adjustably held in place against the shaft *k* by means of the horizontally disposed wedges *t* and *u* which are retained in openings *v* and *w* in the side walls *b* of the oil receptacle. The location of the wedges *t* and *u* is clearly indicated in Fig. 2. When the bearing boxes *n* and *o* become worn it is only necessary to slightly drive the wedges *t* and *u* inward whereby the vertically arranged plates *r* and *s* are moved against the boxes *n* and *o* towards the shaft *k*, and any wear or lost motion is thus taken up as readily understood. When the teeth of the gears *x* and *y* become worn so that there is danger of the same being broken, vecause they do not properly mesh, it is only necessary to loosen or turn back the screw *d* on the left-hand side and turn forward the screw *d* on the right-hand side of the casing so that the wedge *f* will be moved toward the left and the blocks *h* and *j* elevated which, in turn, will elevate the shaft *k* and bring the gears together so that they will properly mesh. The operation of replacing the shaft *k* or the boxes *n* and *o* when the same have become badly worn necessitates simply removing the wedges *t* and *u* thus permitting the plate *s* and the box *o* to be drawn away without disturbing the shaft *z*; since this operation clears away all of the obstructions, the shaft *k* can then be taken away in the same manner.

It will be observed that the walls *b* are carried inward toward the shaft *k*, as shown in Fig. 1 at $b^1$, in order to afford a bearing for the side portions of the bearing boxes $n$ and $o$.

One of the important features of my invention is in providing for the thorough lubrication of the shaft $k$ and its engagement with the bearing-block $h$ since the lower end of the shaft rotates at all times in a receptacle containing oil.

This invention is particularly designed and adapted for use in connection with paper or pulp-beating engines and is particularly adapted to vertically adjust the shaft $k$ and placing new bearing boxes; it is not necessary to dismantle the machine at all in order to make these improvements or repairs. This invention also permits the vertical shaft $k$ to be readily adjusted, as described in detail, which is a great advantage when applied to paper pulp machines.

What I claim, is:—

1. In a shaft-adjusting mechanism, in combination, a casing, a ribbed wedge-shaped element located therein, means for adjustably clamping the same to the casing, a second wedge-shaped element $h$ mounted on the first wedge-shaped element, a bearing-block $j$ mounted on the element $h$ for receiving the lower end of a shaft, as $k$, boxes $n$ and $o$ engaging said shaft, said boxes having a rectangular recess to receive the block $j$, and means for adjustably securing the boxes $n$ and $o$, to the casing, the ribbed wedge-shaped element constituting means to permit the free circulation of oil in the casing as described.

2. In combination, a casing provided with openings in the side portion thereof, a wedge-shaped element provided with ribs or grooves on its underside, a second wedge-shaped element located on the first mentioned element, a bearing-block mounted on the said second element, bearing-boxes inclosing the bearing-block and providing bearing means for a vertical shaft, locking means for the bearing-boxes engaging the openings in the casing, said bearing boxes being provided with means to prevent the bearing-block from rotating, and the grooves in the wedge-shaped element affording free circulation of oil in the casing, as described.

DAVID C. GRISWOLD.

Witnesses:
  K. I. CLEMONS,
  H. W. BOWEN.